May 15, 1934.    J. R. PEIRCE    1,958,590
COOKING UTENSIL
Filed Sept. 27, 1930
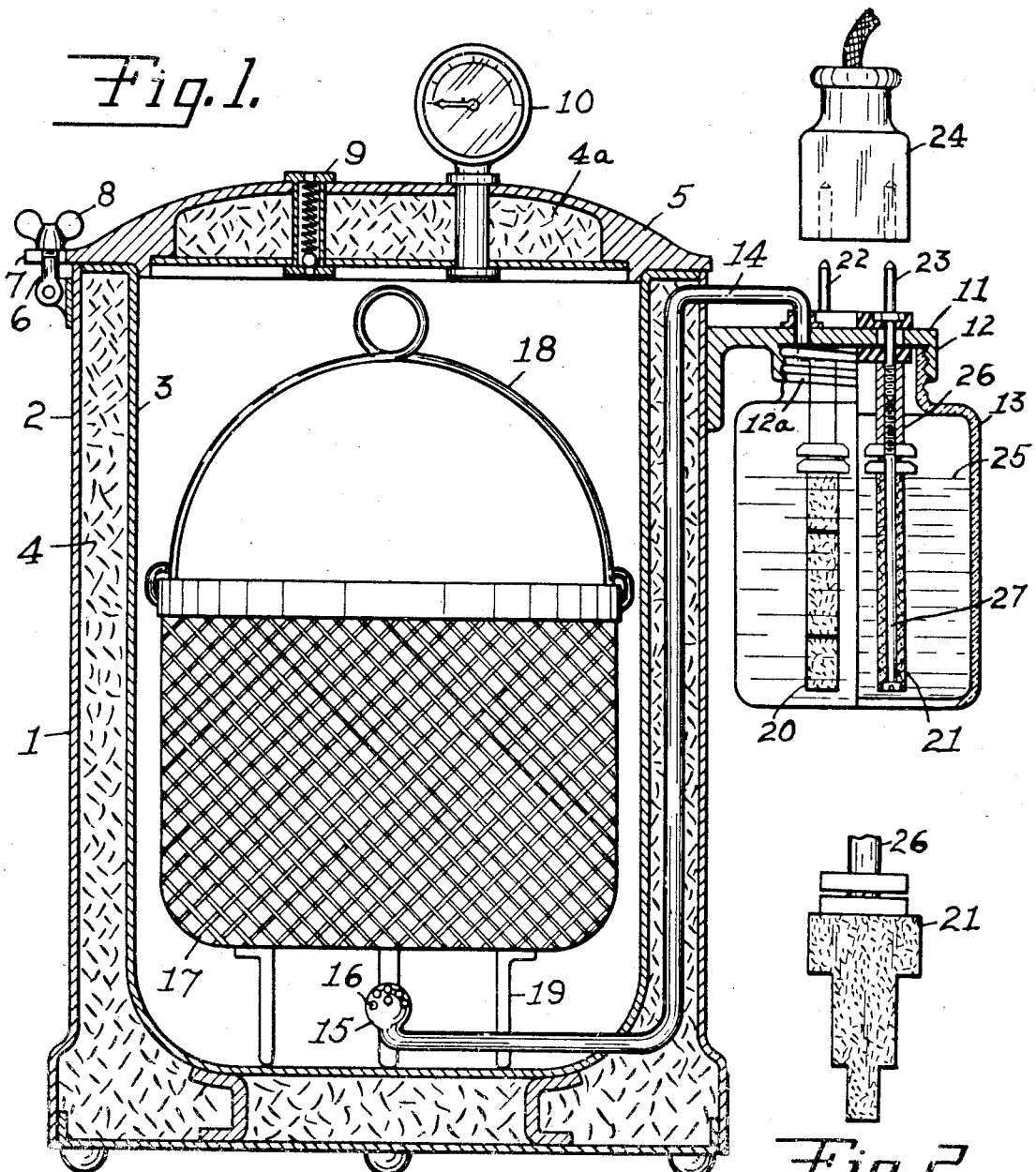
INVENTOR
JOHN ROYDEN PEIRCE
BY
A. C. Mabey
ATTORNEY Patented May 15, 1934

1,958,590

UNITED STATES PATENT OFFICE 1,958,590

COOKING UTENSIL

John Royden Peirce, New York, N. Y.

Application September 27, 1930, Serial No. 484,771

1 Claim. (Cl. 219—35)

This invention relates to a method of and means for cooking vegetables and other foods or substances.

One of the objects of the invention is to devise a method and means whereby foods may be cooked with a minimum loss of flavor and other valuable properties.

Another object is to provide means for cooking foods by steam.

Another object is to provide a device of this character in which the steam in the cooking utensil is maintained under pressure to hasten the cooking and to reduce to a minimum, the amount of steam required.

Another object is to provide a device in which the steam acting upon the food may be maintained at a high temperature for a maximum length of time.

Another object is to provide a device in which water in a small container may be heated to produce steam to be delivered to the food container.

Another object is to provide a device in which the water may be heated by electrodes reaching into it.

Another object is to devise a heating apparatus of this character in which the heat applied to the water for producing steam is automatically reduced as the cooking proceeds.

Another object is to provide a device which, after the food is cooked, will automatically continue to supply a small quantity of steam to keep it warm.

These and other objects will be more fully brought out in the following description of the device.

Referring to the drawing in which I have shown a preferred form of my invention:

Fig. 1 is a sectional elevation of a cooking utensil and a steam producing unit embodying my invention.

Fig. 2 is a detail of one of the electrodes used to heat the water to produce steam.

In the drawing 1 represents the cooking utensil or pot having an outer wall 2 and an inner wall 3. The space between these walls may be filled with a heat insulating substance 4 to keep the heat in the pot. The cover 5 may also be provided with heat insulating material 4a. The cover may be tightly secured to the utensil by any suitable means. For illustration, I have shown a bolt 6 hinged to the pot and cooperating with the slotted projections 7 on the cover. A winged nut 8 serves to hold the cover tightly in place. Several of these fasteners may be used to hold the cover down, or the cover may be hinged on one side to the pot and secured at the other side by one of the fasteners. By fastening the cover on in this manner, steam may be prevented from escaping from the inside of the pot. A safety valve 9 may be employed to permit the steam to escape when the pressure reaches a predetermined value. A pressure gauge 10 may also be employed to indicate the steam pressure within the utensil.

Fixed to the outside of the pot is a bracket 11 threaded as at 12. A jar or water container 13 also provided with threads 12a is screwed into the bracket as shown. Preferably the water container is transparent so that the operator may, at any time, see how much water is contained therein. A tube 14, reaching through the top of the bracket 11 and opening into the container 13, runs down between the inner and outer walls of the pot and then extends inwardly to a point at the middle of the bottom. The end of the tube may be provided with a spherically shaped head 15 having several scattered perforations 16 adapted to direct escaping steam outwardly and upwardly.

A basket 17 having a handle or bail 18 and adapted to contain the food to be cooked is placed in the pot or steam chamber. The basket rests on legs 19 which hold it above the steam tube.

Supported by bracket 11 and insulated therefrom are two electrodes 20, 21 having terminals 22, 23 adapted to cooperate with the fixture 24 for supplying electric current to the electrodes. A quantity of water in the container 13 is heated by the current passing between the electrodes and quickly forms steam. The steam is forced by its own pressure through the tube 14 and fills the pot, working upwardly through and around the food in the basket 17 to cook it.

The electrodes 20, 21 are attached to the depending supporting posts 26 by means of screws 27 reaching through the electrodes and screwed into the posts.

The electrodes may be of carbon or any other suitable material and, as shown in Fig. 2, may be larger at the top than at the bottom. By having the electrodes progressively smaller from top to bottom, the rate at which the area of the electrodes exposed to the water is reduced as the water diminishes by evaporation may be suitably fixed. When the container 13 is filled with water, the water is exposed to the greatest area of the electrodes and is heated at a desired rate. As the water diminishes due to the passage of steam into the cooking compartment, it becomes exposed to a smaller area of the electrodes. By reducing the size of the electrodes toward the bottom, the active area may be further reduced. The lower ends of the electrodes may be of such size as to produce steam at a very slow rate. This point is reached when the food is cooked, and the continued supply of a small quantity of steam serves to keep it warm for a long time. The quantity of water placed in the container 13 may be varied by the operator in accordance with the kind and quantity of food contained in the basket.

In accordance with the provisions of the patent statutes, I have herein described the principle of operation of my invention, together with the apparatus, which I now consider to represent the best embodiment thereof, but I desire to have it understood that the apparatus shown is only illustrative and that the invention may be carried out by other means. Also while it is designed to use the various features and elements in the combination and relations described, some of these may be altered and others omitted without affecting the more general results outlined and the invention extends to such use.

Having described my invention what I claim and desire to secure by Letters Patent is:

A cooking utensil comprising a pot, a basket for food within said pot, a water container attached to the pot, a tube leading from said container to a position below the basket in the pot and a pair of electrodes within said container for heating water, said container being airtight to cause steam therein to be forced into the pot.

JOHN ROYDEN PEIRCE.